Nov. 20, 1956 J. BUEGELEISEN 2,771,305
MOTORCYCLE SADDLE BAG MOUNTING
Filed June 21, 1954

INVENTOR.
JOSEPH BUEGELEISEN
BY
Whittemore Halbert & Belknap
ATTORNEYS

United States Patent Office 2,771,305
Patented Nov. 20, 1956

2,771,305

MOTORCYCLE SADDLE BAG MOUNTING

Joseph Buegeleisen, Huntington Woods, Mich.

Application June 21, 1954, Serial No. 438,207

3 Claims. (Cl. 280—289)

The invention relates to saddle bag mountings for motorcycles and more particularly for use on motorcycles of that type provided with shock absorbers which are located at opposite sides of the rear wheel. These shock absorbing units project outward beyond the wheel and the mud guard therefor, so as to interfere with the direct attachment of the saddle bag to the latter. I have, therefore, devised a construction of mounting for the saddle bag which clears the shock absorbing mechanism and also protects the bag from mud or water thrown up by the wheel. The invention, therefore, consists in the construction as hereinafter set forth.

Figure 1:
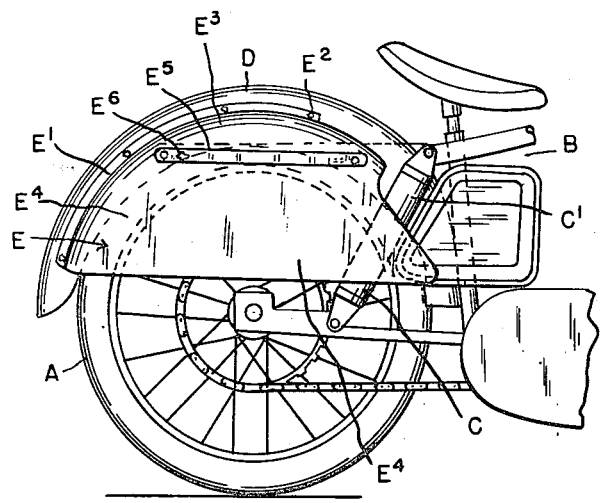
Fig. 1 is a side elevation of a portion of a motorcycle having shock absorbing attachments showing the saddle bag mounting as applied thereto.
Figure 2:
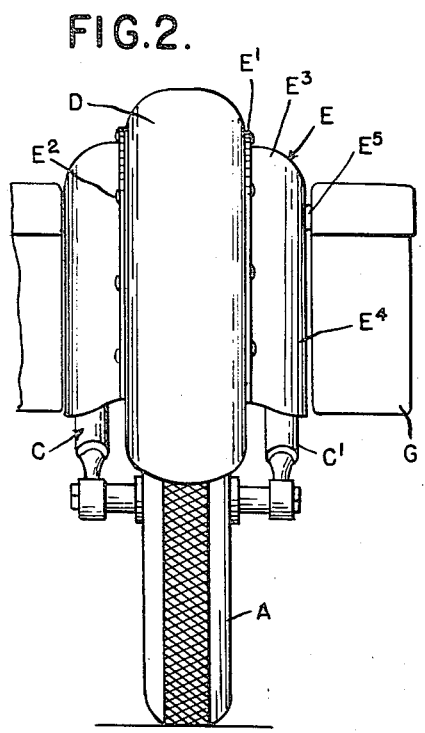
Fig. 2 is a rear elevation.
Figure 3:
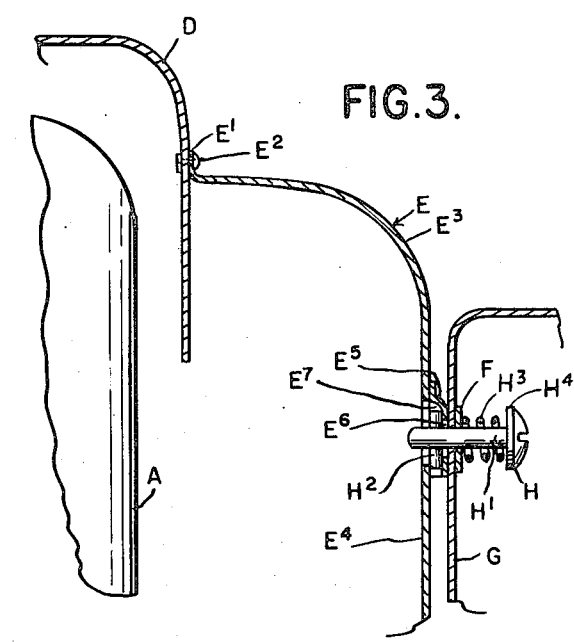
Fig. 3 is a sectional elevation of the parts seen in Fig. 2.

As shown A is the rear wheel of a motorcycle, B a portion of the frame to which are secured the shock absorbing units C on opposite sides of said wheel. The mud guard or fender D is secured to the frame to extend over the top of the wheel and downward in rear thereof. This fender does not, however, cover the shock absorbing units which extend laterally outward beyond the same. As heretofore constructed and as shown in my former Patent 2,423,003, June 24, 1947, the saddle bag mounting is attached to the fender and holds the bag directly adjacent thereto. This could not be used with a motorcycle provided with shock absorbers inasmuch as the latter would be in the way of the bag. Also, the bag should be separated from the space in which the shock absorber is located to be protected therefrom as well as from the mud or water that might be thrown up by the wheel. This I have accomplished by providing a mounting member E preferably formed of pressed sheet metal which has a flange E' extending around and conforming to the curve of the mud guard to which it is directly attached by screws or other fasteners $E^2$. The member E is further provided with a laterally projecting rounded portion $E^3$ also conforming to the curve of the flange E' and fender D and terminating in a skirt portion $E^4$ extending downward to near the axis of the wheel. The curve portion $E^3$ forms a reinforcement for the skirt portion $E^4$ holding the latter rigid in a substantially vertical plane. The skirt $E^4$ clears the shock absorbing mechanism and is provided with means for detachably securing the bag adjacent to the outer face thereof. This means may be of any suitable construction, such for instance as that shown in Patent 2,553,739, Ashdowne, May 22, 1951. This includes a bar F secured inside the saddle bag G to extend horizontally adjacent to that side of the bag which is nearest the motorcycle. A plurality of fasteners H are mounted on the bar F, each having a shank portion H' passing through an aperture in said bar and a corresponding aperture in the bag and a T-head $H^2$ on said shank outside of the bag. The member E has secured to the outer face of the skirt portion $E^4$ a bar $E^5$ having formed therein spaced slots $E^6$ for registering with the fasteners H and for the passage of the T-heads $H^2$ therethrough. Transverse to these slots are grooves $E^7$ in the inner face of the bar $E^5$ formed by struck out portions thereof and which are adapted to receive the T-heads $H^2$ when the shank H' is turned through an angle of 90°. A spring $H^3$ sleeved on the shank H' is between the bar F and a head $H^4$ on said shank serving to yieldably hold the T-head $H^2$ in the groove $E^7$ and also retaining the bag in contact with the outer face of the skirt $E^4$. It will be noted that the portion $E^3$ is partly cut away at its forward end of the passage of a portion of the shock absorbing mechanism such as a dash-pot C'. However, the skirt $E^4$ projects forward of this cut-away portion to contact with the adjacent wall of the bag throughout its length.

The construction just described forms a mounting for a saddle bag which may be placed on one or both sides of the motorcycle and will securely hold the bag in a position clear of the shock absorbing mechanism. Furthermore, the skirt $E^4$ protects the bag against any accidental contact with the shock absorbing mechanism and from any water that may be thrown up by the wheel.

What I claim as my invention is:

1. A saddle bag mounting for motorcycles of the type having a shock absorber mechanism located on the frame at a side of the rear wheel and also having a mud guard for the wheel; comprising a member having a flange extending along and secured to the corresponding side of the mud guard and conforming to the longitudinal curvature thereof, a portion of the same longitudinal curvature extending laterally outward from said flange at the top and rear of said mud guard and a skirt portion depending therefrom in a plane clearing said shock absorbing mechanism, and means for detachably securing a saddle bag to said skirt adjacent to the outer face thereof.

2. The construction as in claim 1 in which said saddle bag securing means includes a bar extending horizontally of in contact with and rigidly attached to the upper part of said skirt portion, being provided with spaced slots therein for receiving securing members on the bag.

3. The construction as in claim 1 in which said laterally extending portion is partially cut-away at the front only for clearance of a portion of said shock absorbing mechanism.

References Cited in the file of this patent

UNITED STATES PATENTS

| | | |
|---|---|---|
| 2,423,003 | Buegeleisen | June 24, 1947 |
| 2,527,433 | Rochelle | Oct. 24, 1950 |
| 2,553,739 | Ashdowne | May 22, 1951 |
| 2,577,560 | Ashdowne | Dec. 4, 1951 |